United States Patent [19]

Hiraguri et al.

[11] Patent Number: 5,106,895
[45] Date of Patent: Apr. 21, 1992

[54] FLUORINE-CONTAINING COPOLYMER COMPOSITION

[75] Inventors: Youichi Hiraguri, Kawasaki; Sakae Murakami; Hajime Inagaki, both of Yamaguchi, all of Japan

[73] Assignee: Mitsui Petrochemical Industries, Ltd., Tokyo, Japan

[21] Appl. No.: 618,627

[22] Filed: Nov. 27, 1990

[30] Foreign Application Priority Data

Nov. 27, 1989 [JP] Japan .................................. 1-307148

[51] Int. Cl.⁵ .............................................. C08K 5/54
[52] U.S. Cl. ................................ 524/188; 525/326.2; 525/342
[58] Field of Search ............... 526/254, 279; 524/188; 525/326.2, 342

[56] References Cited

U.S. PATENT DOCUMENTS

| | | | |
|---|---|---|---|
| 4,373,043 | 2/1983 | Yagi et al. | 528/71 |
| 4,518,758 | 5/1985 | Cavezzan et al. | 525/474 |
| 4,701,508 | 10/1987 | Homma et al. | 526/254 |
| 4,751,114 | 6/1988 | Homma et al. | 526/254 |
| 4,861,667 | 8/1989 | Takayanagi et al. | 525/103 |
| 5,010,141 | 4/1991 | Mueller | 525/276 |

FOREIGN PATENT DOCUMENTS

| | | | |
|---|---|---|---|
| 0180962 | 5/1986 | European Pat. Off. | 526/254 |
| 0185526 | 6/1986 | European Pat. Off. | 526/254 |

*Primary Examiner*—Joseph L. Schofer
*Assistant Examiner*—N. Sarofim
*Attorney, Agent, or Firm*—Sherman and Shalloway

[57] ABSTRACT

Disclosed is a fluorine-containing copolymer composition comprising (A) a fluorine-containing copolymer comprising (a) a fluoro-olefin and (b) an organic silicon compound having an olefinic unsaturated bond and a hydrolyzable group in the molecule and (B) an organic silicon compound having an isocyanate group.

This composition is soluble in an organic solvent at normal temperature and is curable at normal temperature. If a curing catalyst is incorporated in this composition, the resulting composition can be effectively used as a coating composition.

18 Claims, No Drawings

FLUORINE-CONTAINING COPOLYMER COMPOSITION

BACKGROUND OF THE INVENTION (1) Field of the Invention

The present invention relates to a fluorine-containing copolymer composition comprising a fluorine-containing copolymer and an organic silicon compound having an isocyanate group, and a fluorine-containing coating composition and a cured product thereof.

(2) Description of the Prior Art

A fluorine-containing copolymer is excellent in various properties such as weatherability, chemical resistance, water resistance, water repellancy and low frictional property, and therefore, application of this copolymer to a high-performance paint is expected. However since the fluorine-containing copolymer is insoluble or hardly soluble in a solvent at normal temperature, the copolymer cannot be used as a solution type paint or is poor in the adhesion to a material to be coated.

Japanese Examined Patent Publication No. 60-21676 teaches that a fluorine-containing copolymer obtained by copolymerizing four components, that is, a fluoro-olefin, cyclohexyl vinyl ether, an alkyl vinyl ether and a hydroxy-alkyl vinyl ether, is soluble in an organic solvent at normal temperature, a composition formed by incorporating a curing component into this copolymer is curable at normal temperature, and a coating formed from this paint composed mainly of this copolymer has the above-mentioned excellent characteristics of the fluorine-containing copolymer. However, in order to cure this copolymer at normal temperature, it is necessary to incorporate a melamine type curing agent or a urea resin type curing agent as the curing component, and the weatherability is accordingly degraded by incorporation of this curing agent.

We found that a fluorine-containing copolymer comprising a fluoro-olefin, a vinyl ether and a specific organic silicon compound is soluble in an organic solvent at normal temperature and this copolymer is cured at normal temperature without any aid of a curing agent other than a curing catalyst, and we already proposed this copolymer and a coating composition comprising this copolymer (see Japanese Unexamined Patent Publication No. 61-141713). However, it was found that this coating composition is insufficient in the adhesion to a film formed from an undercoating paint comprising an epoxy resin or the like.

SUMMARY OF THE INVENTION

It is a primary object of the present invention to provide a fluorine-containing copolymer which is soluble in an organic solvent at normal temperature and is curable at normal temperature and which shows an excellent adhesion while retaining excellent characteristics inherently possessed by a fluorine-containing copolymer, such as high weatherability, high chemical resistance, high water repellancy, low frictional property, high solvent resistance, high water resistance, high heat resistance and high transparency.

Another object of the present invention is to provide a fluorine-containing coating composition having an improved adhesion and a cured product thereof.

In accordance with the present invention, there is provided a fluorine-containing copolymer composition comprising (A) a fluorine-containing copolymer comprising (a) a fluoro-olefin and (b) an organic silicon compound having an olefinic unsaturated bond and a hydrolyzable group in the molecule and (B) an organic silicon compound having an isocyanate group.

The fluorine-containing copolymer composition is effectively used as a fluorine-containing coating composition formed by incorporating a curing catalyst into this copolymer composition, and a coating having an excellent adhesion can be formed by curing this coating composition.

DETAILED DESCRIPTION OF THE INVENTION

The present invention will now be described in detail.

(A) Fluorine-Containing Copolymer

In the fluorine-containing copolymer composition of the present invention, the fluorine-containing copolymer (A) used as the base component is obtained by copolymerizing (a) a fluoro-olefin and (b) an organic silicon compound having an olefinic unsaturated bond and a hydrolyzable group.

The copolymerization may be either random copolymerization or block copolymerization, but random copolymerization is generally preferable.

(a) Fluoro-olefin

A perfluoro-olefin or perhalo-olefin having at least one fluorine atom in the molecule and preferably having all of hydrogen atoms substituted with fluorine atoms or with fluorine atoms and other halogen atoms, is preferably used as the fluoro-olefin (a). In view of the polymerizability and the properties of the obtained polymer, a fluoro-olefin having 2 to 3 carbon atoms is preferably used.

As the fluoro-olefin (a) used in the present invention, there can be mentioned fluoro-olefins having 2 carbon atoms (fluoroethylenes), such as $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$ and $CCl_2=CClF$, fluoro-olefins having 3 carbon atoms (fluoropropenes), such as $CF_3CF=CF_2$, $CF_3CF=CHF$, $CF_3CH=CF_2$, $CF_3CF=CH_2$, $CHF_2CF=CHF$, $CF_3CH=CH_2$, $CH_3CF=CF_2$, $CH_3CH=CF_2$, $CH_3CF=CH_2$, $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CFC_3CCl=CClF$, $CF_3CCl=CCl_2$, $CClF_3CF=CF_2$, $CCl_3CF=CF_2$, $CF_2ClCCl=CCl_2$, $CFCl_2CCl=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, $CCl_3CF=CHCl$, $CF_2ICF=CF_2$, $CF_2BrCH=CF_2$, $CF_3CBr=CHBr$, $CF_2ClCBr=CH_2$, $CH_2BrCF=CCl_2$, $CF_3CBr=CH_2$, $CF_2CH=CHBr$, $CF_2BrCH=CHF$ and $CF_2BrCF=CF_2$ and fluoro-olefins having at least 4 carbon atoms, such as $CF_3CF_2CF=CF_2$, $CF_3CF=CFCF_3$, $CF_3CH=CFCF_3$, $CF_2=CFCF_2CHF_2$, $CF_3CF_2CF=CH_2$, $CF_3CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_2$, $CH_2=CFCH_2CH_3$, $CF_3(CF_2)_2CF=CF_2$ and $CF_3(CF_2)_3CF=CF_2$.

Among these fluoro-olefins, fluoroethylenes and fluoropropenes are preferably used, and chlorotrifluoroethylene ($CClF=CF_2$) is especially preferably used.

These fluoro-olefins (a) can be used alone or in the form of mixtures of two or more of them.

(b) Organic Silicon Compound

As the organic silicon compound (b) to be copolymerized with the fluoro-olefin compound (a), there can be used a compound having an olefinic unsaturated bond and a hydrolyzable group in the molecule. For example, there can be mentioned compounds represented by the following formulae [I] through [III]:

$$R^1R^2SiY^1Y^2 \quad [I],$$

$$R^1X^1SiY^2Y^2 \quad [II]$$

and $$R^1SiY^1Y^2Y^3 \quad [III]$$

wherein $R^1$ and $R^2$, which may be the same or different, represent a monovalent organic group having an olefinic unsaturated bond, $X^1$ represents a monovalent organic group having no olefinic unsaturated bond, and $Y^1$, $Y^2$ and $Y^3$, which are the same or different, represent a hydrolyzable group.

As specific examples of $R^1$ and $R^2$, there can be mentioned a vinyl group, an allyl group, a butenyl group, a cyclohexenyl group and cyclopentadienyl group, and a terminal olefinically unsaturated group is especially preferable. Furthermore, $R^1$ and $R^2$ can be a group having a terminal unsaturated acid ester bond, such as $$CH_2=CHCOO(CH_2)_3-, CH_2=C(CH_3)COO(CH_2)_3-,$$

$$CH_2=C(CH_3)COO(CH_2)_2-O-(CH_2)- \text{ or}$$

$$CH_2=C(CH_3)COOCH_2CH_2OCH_2-\overset{\underset{\displaystyle OH}{|}}{C}HCH_2O(CH_2)_3-.$$

Among these groups, a group consisting of carbon atoms and hydrogen atoms and having no oxygen atoms is preferable as $R^1$ and $R^2$, and a vinyl group is especially preferable.

As specific example of $X^1$, there can be mentioned monovalent hydrocarbon groups such as a methyl group, an ethyl group, a propyl group, a tetradecyl group, an octadecyl group, a phenyl group, a benzyl group and a tolyl group, and these groups can be halogen-substituted hydrocarbon groups.

As specific examples of $Y^1$, $Y^2$ and $Y^3$, there can be mentioned alkoxy and alkoxyalkoxy groups such as a methoxy group, an ethoxy group, a butoxy group and a methoxyethoxy group, acryloxy groups such as a formyloxy group, an acetoxy group and a propionoxy group, oximes such as $-ON=C(CH_3)_2$, $-ON=CHCH_2C_2H_5$ and $-ON=C(C_6H_5)_2$, and other optional hydrolyzable organic groups.

A compound represented by the above-mentioned general formula III is preferably used as the organic silicon compound, and an organic silicon compound in which $Y^1$, $Y^2$ and $Y^3$ are the same is especially preferably used and an organic silicon compound in which $R^1$ is a vinyl group and $Y^1$ through $Y^3$ represent an alkoxy group or an alokoxyalkoxy group is particularly especially preferably used. For example, there can be preferably used vinyltrimethoxysilane, vinyltriethoxy-silane and vinyl-tris(methoxyethoxy)silane. Furthermore, vinyloxypropyltrimethoxysilane, vinylmethyldiethoxysilane and vinylphenyldimethoxysilane.

These organic silicon compounds can be used alone or in the form of mixtures of two or more of them.

The mixing ratio between the fluoro-olefin (a) and the organic silicon compound (b) in the fluorine-containing copolymer [A] is such that the content of the component (a) is 25 to 70 mole %, preferably 30 to 60 mole %, and the content of the component (b) is 1 to 50 mole %, preferably 3 to 40 mole %. Other Monomer Components The fluorine-containing copolymer [A] can be a copolymer composed solely of the components (a) and (b), but the fluorine-containing copolymer can comprise, in addition to these indispensable components (a) and (b), small amounts of other copolymerizable monomers, such as (c) an alkylvinyl ether, (d) a vinyl ester of a carboxylic acid, (e) an unsaturated carboxylic acid or a derivative thereof, an α-olefin, a cyclo-olefin and an allyl ester of a carboxylic acid, so far as the attainment of the objects of the present invention is not hindered. These other monomers can be random-copolymerized or block-copolymerized.

As specific examples of the alkylvinyl ether (c), there can be mentioned linear alkylvinyl ethers such as ethylvinyl ether, propylvinyl ether, isopropylvinyl ether, butylvinyl ether, tert-butylvinyl ether, pentylvinyl ether, hexylvinyl ether, isohexylvinyl ether, octylvinyl ether and 4-methyl-1-pentylvinyl ether, and cycloalkylvinyl ethers such as cyclopentylvinyl ether and cyclohexylvinyl ether.

Among them, ethylvinyl ether, propylvinyl ether and butylvinyl ether are preferably used.

These alkylvinyl ethers (c) can be used singly or in the form of mixtures of two or more of them.

The content of the alkylvinyl ether (c) in the fluorine-containing copolymer [A] is 0 to 50 mole %, preferably 10 to 40 mole %.

As the carboxylic acid vinyl ester (d), there can be mentioned linear carboxylic acid vinyl esters such as vinyl acetate, vinyl propionate, vinyl butyrate, vinyl caproate, vinyl caprylate, vinyl capriate, vinyl laurate and vinyl stearate, vinyl esters of carboxylic acids having a sec-alkyl group, such as vinyl isobutyrate and vinyl 2-methylbutanoate, vinyl esters of carboxylic acids having a tert-alkyl group, such as vinyl 2,2-dimethylpropanoate, vinyl 2,2-dimethylbutanoate, vinyl 2,2-dimethylpentanoate, vinyl 2,2-dimethylhexanoate, vinyl 2,2-diethylbutanoate, vinyl 2-ethyl-2-methylbutanoate and vinyl 2-ethylpentanoate, alicyclic carboxylic acid vinyl esters such as vinyl cyclohexane-carboxylate, vinyl 4-methylcyclohexanecarboxylate, vinyl 4-tert-butylcarboxylate and vinyl cyclopentane-carboxylate, and aromatic carboxylic acid vinyl esters such as vinyl benzoate, vinyl 4-methylbenzoate, vinyl 4-tert-butylbenzoate, vinyl 4-chlorobenzoate and vinyl naphthalane-carboxylate. Among them, an acetic acid vinyl ester is preferably used, and vinyl acetate is especially preferably used.

These carboxylic acid vinyl esters (d) can be used alone or in the form of mixtures of two or more of them.

In the case where the carboxylic acid vinyl ester (d) is copolymerized in the fluorine-containing copolymer [A], the fluorine-containing copolymer composition containing this fluorine-containing copolymer A has a highly improved adhesion.

As the unsaturated carboxylic acid or unsaturated carboxylic acid derivative (e), there can be mentioned, for example, unsaturated carboxylic acids such as acrylic acid, methacrylic acid, α-ethylacrylic acid, crotonic acid, 4-pentenic acid, 5-hexenic acid, 6-heptenic acid, 7-octenic acid, 8-nonanoic acid, 9-decanoic acid, 10-undecylenic acid, maleic acid, fumaric acid, itaconic acid, citraconic acid, tetrahydrophthalic acid and endo-cis-bicyclo[2,2,1]hepto-5-ene-2,3-dicarboxylic acid, monoesters and diesters of these unsaturated carboxylic acids with alcohols having 1 to 20 carbon atoms, and olefinic acid anhydrides such as maleic anhydride, itaconic anhydride, citraconic anhydride and tetrahydrophthalic anhydride.

Among them, diesters of maleic acid and diesters of fumaric acid are preferably used, and dimethyl maleate, diethyl maleate, dimethyl fumarate and diethyl fumarate are especially preferably used.

These unsaturated carboxylic acids and derivatives (e) can be used alone or in the form of mixtures of two or more of them.

In the case where the unsaturated carboxylic acid or its derivative (e) is copolymerized in the fluorine-containing copolymer [A], the fluorine-containing copolymer composition containing this fluorine-containing copolymer [A] has a highly improved adhesion.

The amounts of the carboxylic acid vinyl ester (d) and the unsaturated carboxylic acid or its derivative (e) are such that the total content of the components (d) and (e) is 0 to 60 mole %, preferably 1 to 55 mole %, based on the fluorine-containing copolymer [A]. In the case where the unsaturated carboxylic acid is used, it is preferred that the amount of the carboxyl group in the composition be smaller than the amount of the isocyanate group of the organic silicon compound B having an isocyanate group, described hereinafter.

Preferably, the fluorine-containing copolymer A comprising the above-mentioned monomer components has a number average molecular weight of 3,000 to 200,000, especially 5,000 to 100,000, as determined by the gel permeation chromatography.

The fluorine-containing copolymer [A] is soluble at normal temperature in aromatic hydrocarbons such as benzene, toluene and xylene, ketones such as acetone and methylethylketone, ethers such as diethyl ether, dipropyl ether, methylcellosolve and ethylcellosolve, esters such as ethyl acetate and butyl acetate, alcohols such as ethanol, and halogenated hydrocarbons such as trichloromethane, dichloroethane and chlorobenzene.

The fluorine-containing copolymer [A] can be prepared by copolymerizing the above-mentioned monomers in the presence of a radical initiator.

Various known radical initiators can be used. For example, there can be mentioned organic peroxides and organic peresters such as benzoyl peroxide, dichlorobenzoyl peroxide, dicumyl peroxide, di-tert-butyl peroxide, 2,5-dimethyl-2,5-di(peroxibenzoate)hexyne-3, 1,4-bis(tert-butylpeoxyisopropyl)benzene, lauroyl peroxide, dilauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butylperdiethyl acetate, and azo compounds such as azobisisobutyronitrile and dimethyl azoisobutyrate. Among them, there are preferably used dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The copolymerization reaction is preferably carried out in a reaction medium comprising an organic solvent. As the organic solvent, there can be used aromatic hydrocarbon such as benzene, toluene and xylene, aliphatic hydrocarbons such as n-hexane, cyclohexane and n-heptane, halogenated aromatic hydrocarbons such as chlorobenzene, bromobenzene, iodobenzene and o-bromotoluene, and halogenated aliphatic hydrocarbons such as tetrachloromethane 1,1,1-trichloroethane, tetrachloroethylene and 1-chlorobutane.

The copolymerization reaction is preferably carried out in the above-mentioned reaction medium by adding the radical initiator at a molar ratio of $1 \times 10^{-2}$ to $2 \times 10^{-3}$ to the total amount of the monomers. The polymerization temperature is $-30°$ to $200°$ C., preferably $20°$ to $100°$ C., and the polymerization pressure is 0 to 100 kg/cm$^2$G, preferably 0 to 50 kg/cm$^2$G. The reaction time is 0.5 to 60 hours, preferably 2 to 30 hours.

In the case where the fluorine-containing copolymer [A] is prepared by using a chlorine-containing fluoro-olefin as the fluoro-olefin (a), it is preferred that a chlorine scavenger be made present in the system at the polymerization reaction and/or the purification of the obtained copolymer.

As the chlorine scavenger, there can be used the following compounds (i) through (iii).

More specifically, there can be used a composite compound (i) represented by the following formula:

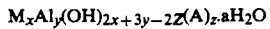

wherein M represents Mg, Ca or Zn, A represents $CO_3$ or $HPO_4$, x, y and z represent a positive number, and a is 0 or a positive number.

As specific examples of the composite compound (i), there can be mentioned $Mg_6Al_2(OH)_{16}CO_3.4H_2O$, $Mg_8Al_2(OH)_{20}CO_3.5H_2O$, $Mg_5Al_2(OH)_{14}CO_3.4H_2O$, $Mg_{10}Al_2(OH)_{22}CO_3.4H_2$, $Mg_6Al_2(OH)_{16}HPO_4.4H_2O$, $Ca_6Al_2(OH)_{16}CO_3.4H_2O$ and $Zn_6Al_6(OH)_{16}CO_3.4H_2O$.

The composite compound (i) may be a compound which does not conform precisely with the above-mentioned formula, for example, a compound in which a part of OH of $Mg_2Al(OH)_3.3H_2O$ is substituted by $CO_3$, or a compound of the formula $Mg_{4.5}Al_2(OH)_{1.3}CO_3.3.5H_2O$. Furthermore, water of crystallization may be removed from the foregoing compounds.

Among these composite compounds (i), those in which M is Mg and A is $CO_3$ are preferably used.

As another type of the chlorine scavenger, there can be mentioned an alkaline earth metal basic compound (ii). For example, there can be used alkaline earth metal oxides such as MgO and CaO, alkaline earth metal hydroxides such as $Mg(OH)_2$ and $Ca(OH)_2$, and alkaline earth metal carbonates such as $MgCO_3$ and $CaCO_3$.

The alkaline earth metal basic compound can be a double salt such as $(MgCO_3)_4Mg(OH)_2.5H_2O$, and water of crystallization may be removed from such a compound.

Among the foregoing alkaline earth metal basic compounds (ii), an Mg-containing compound is preferably used.

As still another type of the chlorine scavenger, there can be mentioned epoxy group-containing compounds (iii), for example, silicon-containing epoxy compounds such as γ-glycidoxypropyltrimethoxysilane and β-(3,4-epoxycyclohexyl)ethyltrimethoxysilane, and aliphatic epoxy compounds such as trimethylolpropane polyglycidyl ether and neopentyl glycol diglycidyl ether.

Among these compounds, a silicon-containing epoxy compound such as γ-glycidoxypropyltrimethoxysilane is preferably used.

Of the foregoing chlorine scavengers, an inorganic chlorine scavenger has a higher speed of the reaction with chlorine (hydrochloric acid) than an organic chlorine scavenger and is not soluble in the polymerization system or the purification system and therefore, the inorganic chlorine scavenger can be easily removed from the system. Accordingly, the inorganic chlorine scavenger is preferably used, and a composite compound represented by the formula (i) is especially preferably used.

If the chlorine scavenger is made present at the polymerization reaction and/or the purification of the obtained copolymer, discoloration of the obtained fluorine-containing copolymer [A] can be effectively prevented. Especially, if the chlorine scavenger is made present in the reaction mixture at the polymerization reaction, discoloration of the obtained fluorine-containing copolymer [A] can be highly effectively prevented.

If the chlorine scavenger is made present in the system when the obtained fluorine-containing copolymer [A] is purified with an alcohol, occurrence of rusting is effectively prevented in a material, such as a metal coated with a paint formed by dissolving the fluorine-containing copolymer [A] in an organic solvent, for example, toluene.

In the case where the chlorine scavenger is used at the polymerization reaction, it is preferred that the chlorine scavenger be used in an amount of 0.5 to 100 g, especially 1 to 70 g, per mole of the chlorine atom contained in the fluoro-olefin (a).

In the case where the chlorine scavenger is used at the purification, it is preferred that the chlorine scavenger be used in an amount of 0.5 to 100 g, especially 1 to 70 g, per 100 g of the obtained fluorine-containing copolymer [A].

[B] Organic Silicon Compound

An organic silicon compound having at least one isocyanate group is used as the component [B] in the present invention.

Since the component [B] has a compatibility with the fluorine-containing copolymer [A] and the isocyanate group in the component [B] reacts with the hydroxyl group the like of a material to be coated, for example, a coating formed from an undercoat paint composed of an epoxy resin or the like, the fluorine-containing copolymer composition of the present invention shows an excellent adhesion.

Preferably, an organic silicon compound having at least one isocyanate group and at least one hydrolyzable group capable of reacting with the hydrolyzable group in the fluorine-containing copolymer [A] to form a siloxane bond is used as the component [B].

This organic silicon compound having at least one isocyanate group and at least one hydrolyzable group is characterized in that the isocyanate group reacts with a material to be coated in the above-mentioned manner and the hydrolyzable group reacts with the hydrolyzable group of the fluorine-containing copolymer [A] to form a siloxane bond by the hydrolysis. Accordingly, this organic silicon compound having an isocyanate group and a hydrolyzable group gives a higher adhesion to the fluorine-containing copolymer composition than the adhesion attained by the use of an organic silicon compound having only an isocyanate group.

As is seen from the foregoing description, the component [B] is used as the adhesion-imparting agent.

As the hydrolyzable group in the component [B], there can be mentioned an alkoxy group, an acyloxy group, a phenoxy group, an iminoxy group and an alkenyloxy group. Among these groups, an alkoxy group is especially preferable.

As organic silicon compound represented by the following general formula IV can be used as the component B:

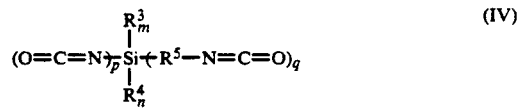
(IV)

wherein $R^3$ represents a hydrolyzable group, $R^4$ represents a hydrogen atom or an organic group, $R^5$ represents an organic group, when there are present a plurality of groups $R^3$, $R^4$ or $R^5$, they may be the same or different, m is an integer of from 0 to 3, n is an integer of from 0 to 3, p is an integer of from 0 to 4, and q is an integer of from 0 to 4, with the proviso that the requirements of $m+n+p+q=4$ and $p+q \geq 1$ are satisfied.

As specific examples of the compound represented by the general formula [IV], there can be mentioned organic silicon compounds represented by general formulae [V] and [VI] given hereinafter.

The silicon compound represented by the following general formula V is an organic silicon compound in which an isocyanate group is bonded to the silicon atom through $R^8$:

(V)

wherein $R^6$ represents a hydrolyzable group, $R^7$ represents a hydrogen atom or an organic group, $R^8$ represents an alkylene, oxyalkylene or alkenylene group having 1 to 10 carbon atoms, m is an integer of from 1 to 3 and n is an integer of from 0 to 2, with the proviso that the requirement of $m+n=3$ is satisfied, and when there are present a plurality of groups $R^6$ or $R^7$, they may be the same or different.

As the hydrolyzable group $R^6$ of the general formula [V], there can be mentioned, for example, an alkoxy group, an acyloxy group, a phenoxy group, an iminoxy group and an alkenyloxy group.

As the organic group $R^7$, there can be mentioned, for example, an alkyl group, an aryl group and an aralkyl group.

As specific examples of the organic silicon compound represented by the general formula [V], there can be mentioned γ-isocyanatopropyltrimethoxysilane, γ-isocyanatopropyltriethoxysilane, γ-isocyanatopropyltripropoxysilane, γ-isocyanatopropylmethyldimethoxysilane, γ-isocyanatopropylmethyldiethoxysilane, γ-isocyanatopropyltriacetoxysilane, γ-isocyanatopropyltribenzoyloxysilane, γ-isocyanatopropylmethyldiacetoxysilane, γ-isocyanatopropyldimethylacetoxysilane, γ-isocyanatopropylphenyldibenzoyloxysilane, γ-isocyanatopropylphenyldibenzoyloxysilane, γ-isocyanatopropyldiphenylbenzoyloxysilane, γ-isocyanatopropyltriisopropenyloxysilane, γ-isocyanatopropylmethyldiisopropenyloxysilane, γ-isocyanatopropyltris(dimethyliminoxy)silane, γ-isocyanatorpropyltris(methylethyliminoxy)silane, γ-isocyantopropylbis(dimethylimonoxy)silane, γ-iso-cyanatepropyldimethyl(dimethyliminoxy)silane, ε-isocyanatoethoxyethyltrimethoxysilane, ε-isocyanatoethoxyethyltriethoxysilane, ε-isocyanatoethoxyethyltripropoxysilane, and ε-isocyanatoethoxyethylmethyldimethoxysilane.

The compound represented by the following general formula VI is an organic silicon compound in which an isocyanato group is directly bonded to the silicon atom:

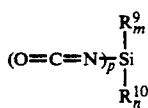

$$(O=C=N)_p Si\begin{matrix} R^9_m \\ R^{10}_n \end{matrix} \qquad (VI)$$

wherein $R^9$ represents a hydrolyzable group $R^{10}$ represents an organic group, p is an integer of from 1 to 4 and m and n represent an integer of from 0 to 3, with the proviso that the requirement of $p+m+n=4$ is satisfied and when p is 1, m is an integer of from 1 to 3, n is an integer of from 0 to 2 and the requirement of $p+m+n=4$ is satisfied, and when there are present a plurality of groups $R^9$ or $R^{10}$, they may be the same or different.

As the hydrolyzable group $R^9$ of the general formula [VI], there can be mentioned, for example, an alkoxy group, an acyloxy group and a phenoxy group.

As the organic group $R^{10}$ of the general formula [VI], there can be mentioned, for example, an alkyl group, an alkenyl group, a cycloalkyl group, an aryl group and an arylalkyl group.

As specific examples of the organic silicon compound [B] represented by the general formula [VI], there can be mentioned silyl tetraisocyanate, methylsilyl triisocyanate, butylsilyl triisocyanate, octylsilyl triisocyanate, methoxysilyl triisocyanate, ethoxysilyl triisocyanate, phenylsilyl triisocyanate, vinylsilyl triisocyanate, dimethylsilyl diisocyanate, methylphenyl diisocyanate, dimethoxysilyl diisocyanate and dibutoxysilyl diisocyanate.

An organic silicon compound represented by the above general formula [V] is preferably used, and γ-isocyanatopropyltrimethoxysilane and γ-isocyanatopropyltriethoxisilane are especially preferably used.

It is preferred that the component [B] be incorporated in an amount of 0.1 to 60 parts by weight, especially 1 to 40 parts by weight, per 100 parts by weight of the component [A]. Fluorine-Containing Copolymer Composition The fluorine-containing copolymer composition of the present invention comprising the components [A] and [B] is soluble in an organic solvent at normal temperature, and the composition is curable at normal temperature and shows an excellent adhesion to a material to be coated. Accordingly, the composition of the present invention is preferably used as the main component of a coating-forming material of a fluorine-containing coating composition curable at normal temperature.

A known curing catalyst [C] can be used for curing the fluorine-containing copolymer composition of the present invention. Accordingly, in the case where the fluorine-containing copolymer composition is used as a coating composition, the composition is generally used in combination with a curing catalyst [C].

As typical examples of the curing catalyst [C], there can be mentioned metal-containing compounds such as tetrapropyl titanate, tetrabutyl titanate, tin octylate, lead octylate, cobalt octylate, zinc octylate, calcium octylate, lead naphthenate, cobalt naphthenate, dibutyl tin diacetate, dibutyl tin octoate, dibutyl tin dilaurate, dibutyl tin malate, butyl tin trichloride, dihydroxybutyl tin chloride and dihydroxybutyl tin monooctoate, acidic compounds such as p-toluene-sulfonic acid, trichloroacetic acid, phosphoric acid, a monoalkyl phosphate, a dialkyl phosphate, a phosphoric acid ester of 2-hydroxyethyl (meth)acrylate, a monoalkyl phosphite and a dialkyl phosphite, and basic compounds such as butylamine, dibutylamine, hexylamine, tertbutylamine, ethylenediamine, triethylamine, isophoronediamine and imidazole. Among these compounds, tin compounds such as dibutyl tin diacetate, dibutyl tin dioctoate, dibutyl tin dilaurate and dibutyl tin malate are preferably used.

It is preferred that the component [C] be incorporated in an amount of 0.03 to 50 parts by weight, especially 0.3 to 30 parts by weight, per 100 parts by weight of the component [A].

The fluorine-containing coating composition formed by incorporating the curing catalyst [C] into the fluorine-containing copolymer composition is ordinarily dissolved in an organic solvent and is used in the form of a solution. As the solvent used for this purpose, there can be mentioned, for example, toluene, xylene, butyl acetate, isobutylmethylketone, methylcellosolve, ethylcellosolve and mixtures of two or more of them.

It is preferred that the organic solvent be used in an amount of 40 to 300 parts by weight, especially 60 to 120 parts by weight, per 100 parts by weight of the fluorine-containing coating composition.

In the coating composition, in addition to the fluorine-containing coating composition, there can be incorporated a pigment, a dye, a dehydrating agent (such as trimethyl orthoformate), a dispersant, other paint additions (such as a leveling agent and a wetting agent), and an alkyl silicate or an oligomer or hydrolysis product thereof (such as an oligomer of tetramethyl-o-silicate) according to need.

Since at least a hydrolyzable group derived from the fluorine-containing copolymer [A] is present in the fluorine-containing coating composition of the present invention, curing of the fluorine-containing copolymer composition can be caused, for example, by the contact of this hydrolyzable group with water contained in air and the resulting hydrolysis. In this case, it is presumed that crosslinking reaction is caused by the siloxane bond between molecules of the fluorine-containing copolymer [A] or between the fluorine-containing copolymer [A] and the isocyanate group-containing organic silicon compound [B]. Furthermore, it is presumed that the isocyanate group present in the isocyanate group-containing organic silicon compound B does not react with the hydrolyzable group and does not participate in the curing of the composition. It also is presumed that the curing catalyst [C] acts as the catalyst for this crosslinking reaction.

Curing of the fluorine-containing coating composition is advanced even at normal temperature, but curing can be performed under heating.

A coating (cured product) formed by curing the fluorine-containing coating composition has an excellent adhesion to a material to be coated, especially to a coating formed from an organic undercoating paint composed of an epoxy resin, an acrylic rubber or a urethane resin. Furthermore, the coating of the fluorine-containing coating composition has an excellent adhesion to a coating even after the lapse of a considerable time from the point of coating the undercoating paint.

The reason why the coating has an excellent adhesion has not been completely elucidated, but it is believed that the isocyanate group present in the organic silicon compound [B] containing an isocyanate group reacts with a hydroxyl group or the like present in the coating formed from the undercoating paint.

Furthermore, the coating is excellent in weatherability, chemical resistance, water repellancy, low frictional property, solvent resistance, water resistance, heat resistance and transparency.

Accordingly, a beautiful coated article which is excellent in the weatherability, chemical resistance, water repellancy, low frictional property, solvent resistance, water resistance and heat resistance can be obtained by coating a paint composed of the fluorine-containing coating composition.

The coating composition can be prepared by dissolving the fluorine-containing copolymer [A], the isocyanate group-containing organic silicon compound [B], the curing agent [C] and other components to be added according to need in an organic solvent. In this case, there can be adopted a method in which all of the components are contained in one organic solvent, and a method in which a first solution formed by dissolving the components [A] and [B] and other components to be incorporated according to need in an organic solvent and a second solution formed by dissolving the curing catalyst [C] and other components to be added according to need in an organic solvent and the two solutions are mixed just before the coating composition is applied.

The coating composition comprising the fluorine-containing copolymer composition can be coated on the surface of a substrate such as a metal, wood, plastics, ceramics, paper or glass according to the coating method customarily adopted for ordinary liquid paints, such as the brush coating method, the spray coating method, the roller coater coating method or the like, and can be used as a paint for household electric appliances, an outer coating paint for constructions, tiles and precoat metals (PCM), an enamel paint for transporting machines and vehicles, especially automobiles, a metallic base paint and a clear paint.

It is especially preferred that as described hereinbefore, the curing catalyst [C] be incorporated into the fluorine-containing copolymer composition of the present invention, the resulting composition be mixed into an organic solvent and the resulting coating composition be used as a paint. Furthermore, the fluorine-containing copolymer composition can be used as a coating agent for glass, a metal such as stainless steel or a ceramic article. Furthermore, the fluorine-containing copolymer composition of the present invention can be used as a starting material of a sealing agent or an adhesive.

According to the present invention, a specific organic silicon compound having an isocyanate group is incorporated as an adhesion imparting agent into a fluorine-containing copolymer comprising a fluoro-olefin and a specific organic silicon compound. Therefore, a fluorine-containing copolymer composition soluble in an organic solvent at normal temperature and curable at normal temperature, which retains excellent characteristics of the fluorine-containing copolymer, such as excellent weatherability, chemical resistance, water repellancy, low frictional property, solvent resistance, water resistance, heat resistance and transparency and shows an excellent adhesion, can be obtained.

Furthermore, since a curing catalyst is incorporated into this fluorine-containing copolymer composition, the adhesion is highly improved in the resulting fluorine-containing coating composition.

Still further, when a coating (cured product) is formed by curing this fluorine-containing coating composition, a beautiful coated article which is excellent in the weatherability, chemical resistance, water repellancy, low frictional property, solvent resistance, water resistance and heat resistance can be obtained.

EXAMPLES

The present invention will now be described in detail with reference to the following examples.

PRODUCTION EXAMPLE 1

The inner atmosphere of a 1.5-liter autoclave equipped with a stainless steel stirrer was replaced by nitrogen, and a solution of 30.5 g of vinyltrimethoxysilane (hereinafter referred to as "TMVS"), 82.2 g of ethylvinyl ether (hereinafter referred to as "EVE"), 15.0 g of n-butylvinyl ether (hereinafter referred to as "BVE"), 52.5 g of diethyl maleate, 9.3 g of a fired product of powdery synthetic hydrotalcite [$Mg_{4.5}Al_2(OH)_{13}CO_3 \cdot 3.5H_2O$] (hereinafter referred to as "SHT") as the chlorine scavenger and 5.4 g of dilauroyl peroxide as the radical initiator in 500 ml of benzene was charged in the autoclave in a nitrogen current. Then, 139.8 g of chlorotrifluoroethylene (hereinafter referred to as "CTFE") was introduced into the autoclave, and the temperature was elevated to 65° C. and reaction was carried out for 8 hours.

Then, the autoclave was water-cooled to stop the reaction, and after the cooling, the unreacted monomers were expelled and the autoclave was opened. The reaction liquid was taken out and charged in a 1-liter eggplant type flask. Then, 150 g of xylene, 100 g of methanol and 9.4 g of SHT were added to the reaction liquid, and a heat treatment was carried out with stirring at 50° C. for 1.5 hours and at 60° C. for 1.5 hours. The residual monomers and solvent were removed by distillation under reduced pressure by an evaporator. Then, 400 g of xylene was added to the liquid and the solvent was removed again by distillation under reduced pressure by an evaporator. Then, 500 g of xylene was added to the residue and the solution was filtered to remove SHT. The filtrate was concentrated under reduced pressure to obtain 262 g of a colorless transparent copolymer I.

The number average molecular weight of the obtained copolymer I was 10,000 as determined by the gel permeation chromatography (GPC). When the composition of the copolymer I was analyzed by the elementary analysis and NMR, it was found that the CTFE/TMVS/EVE/DEM/BVE molar ratio was 41/6/34/13/6.

PRODUCTION EXAMPLE 2

The inner atmosphere of a 1.5-liter autoclave equipped with a stainless steel stirrer was replaced by nitrogen, and a solution of 30.5 g of TMVS, 82.2 g of EVE, 15.0 g of BVE, 36.2 g of DEM, 15.5 g of diethyl fumarate (hereinafter referred to as "DEF"), 9.3 g of SHT and 5.4 g of dilauroyl peroxide in 500 ml of benzene was charged into the autoclave. Then, 139.8 g of CTFE was introduced into the autoclave, and the temperature was elevated to 65° C. and reaction was carried out for 8 hours.

Then, 263 g of a colorless transparent copolymer II was obtained in the same manner as described in Production Example 1.

The number average molecular weight of the obtained copolymer II was 11,000 as determined by GPC. When the composition of the copolymer II was analyzed by the elementary analysis and NMR, it was found that the CTFE/TMVS/EVE/(DEM+DEF)/BVE molar ratio was 48/7/36/13/6.

EXAMPLE 1

A first solution comprising 35.4 parts by weight of the copolymer I obtained in Production Example 1, 7.1 parts by weight of γ-isocyanatopropyltrimethoxysilane as the component [B], 1.8 parts by weight of an oligomer of tetramethyl orthosilicate as the paint additive, 1.8 parts by weight of trimethyl orthoformate as the dehydrating agent, 25.0 parts by weight of titanium oxide as the pigment and 28.9 parts by weight of xylene was prepared.

Separately, a zinc steel sheet (SPG) specified in JIS G-3302 was coated with an epoxy paint (Marine SC supplied by Mitsui Kinzoku Toryo Kagaku), and the coated steel sheet was subjected to outdoor exposure for 10 days to obtain a material to be coated.

To 100 parts by weight of the first solution was added 1.8 parts by weight of a xylene solution (second solution) containing 6.3% by weight of dibutyl tin dilaurate [n-Bu$_2$Sn(OCOC$^1$$_1$H$_{23}$)$_2$] to from a fluorine-containing coating composition. The composition was coated on the material to be coated by using a 100-μm applicator. The obtained test sheet having a coating formed thereon was subjected to outdoor exposure for 1 week and the following cross-cut adhesion test described below was carried out. The obtained results are shown in Table 1. Cross-Cut Adhesion Test According to the cross-cut adhesion test of ordinary paint test method 6.15 of JIS K-5400, 1979), cross cuts were formed on the surface of the coating of the test sheet, and an adhesive cellophane tape having a width of 20 mm was applied to the cross-cut surface of the coating. Then, a spatula having a width of 7 mm was pressed on the adhesive cellophane tape, and the adhesive cellophane tape was strongly rubbed with the spatula to cause the adhesive cellophane tape to adhere closely to the surface of the coating. Then, the adhesive cellophane tape was pulled up in the vertical direction and promptly peeled. This adhesion-peeling test was carried out from each direction of the four sides of the square cross cuts, namely 4 times as a whole. The number (x) of the square cross cuts not peeled but left was examined, and the test result was expressed by this number (x/100).

EXAMPLE 2

A coating was formed in the same manner as described in Example 1 except that the copolymer II obtained in Production Example 2 was used instead of the copolymer I, and the coating was subjected to outdoor exposure for 1 week and the cross-cut adhesion test was carried out. The obtained results are shown in Table 1.

COMPARATIVE EXAMPLE 1

A coating was prepared in the same manner as described in Example 1 except that γ-isocyanatopropyltrimethoxysilane was not added. The coating was subjected to outdoor exposure for 1 week and the cross-cut adhesion test was carried out. The obtained results are shown in Table 1.

COMPARATIVE EXAMPLE 2

A coating was prepared in the same manner as described in Example 2 except that γ-isocyanatopropyltrimethoxysilane was not added. The coating was subjected to outdoor exposure for 1 week and the cross-cut adhesion test was carried out. The obtained results are shown in Table 1.

PRODUCTION EXAMPLE 3

The inner atmosphere of a 1.5-liter autoclave equipped with a stainless steel stirrer was replaced by nitrogen, and 180 ml of benzene, 54.3 g of ethylvinyl ether (EVE), 21.0 g of n-butylvinyl ether (BVE), 72.3 g of vinyl acetate (hereinafter referred to as "VAc"), 43.6 g of trimethoxyvinylsilane (TMVS) and 13.0 g of a fired product of powdery synthetic hydrotalcite [Mg$_{4.5}$Al$_2$(OH)$_{13}$CO$_3$.3.5H$_2$O] (SHET) as the chlorine scavenger were charged in the autoclave in a nitrogen current. Then, 257 g of chlorotrifluoroethylene (CTFE) was introduced into the autoclave and the temperature was elevated to 65° C.

Then, an initiator solution of 7.6 g of dilauroyl peroxide in 120 ml of benzene was fed to the obtained mixture over a period of 4 hours. Reaction was carried out at 65° C. for 6 hours.

Then, the autoclave was water-cooled to stop the reaction, and after the cooling, the unreacted monomers were expelled and the autoclave was opened. The reaction liquid was taken out and charged in a 1.5-liter eggplant type flask. Then, 210 g of xylene, 120 g of methanol and 13.6 g of SHT were added to the reaction liquid, and a heat treatment was carried out with stirring at 50° C. for 1.5 hours and at 60° C. for 1.5 hours. The residual monomers and solvent were removed by distillation under reduced pressure by an evaporator. Then, 550 g of xylene was added to the liquid and the solvent was removed again by distillation under reduced pressure by an evaporator. Then, 500 g of xylene was added to the residue and the solution was filtered to remove SHT. The filtrate was concentrated under reduced pressure to obtain 323 g of a colorless transparent copolymer III.

The number average molecular weight of the obtained copolymer III was 16,800 as determined by the gel permeation chromatography (GPC). When the composition of the copolymer III was analyzed by the elementary analysis and NMR, it was found that the CTFE/EVE/BVE/VAc/TMVS molar ratio was 41/23/16/25/5.

EXAMPLE 3

A coating was prepared in the same manner as described in Example 1 except that the copolymer III obtained in Production Example 3 was used instead of the copolymer I, and the coating was subjected to outer exposure for 1 week and the cross-cut adhesion test was carried out. The obtained results are shown in Table 1.

EXAMPLE 4

A coating was prepared in the same manner as described in Example 1 except that γ-isocyanatopropyltriethoxysilane was used as the component [B] instead of γ-isocyanatopropyltrimethoxysilane, and the coating was subjected to outdoor exposure for 1 week and the cross-cut adhesion test was carried out. The obtained results are shown in Table 1.

COMPARATIVE EXAMPLE 3

A coating was prepared in the same manner as described in Example 3 except that γ-isocyanatopropyltrimethoxysilane was not added, and the coating was subjected to outdoor exposure for 1 week and the cross-cut adhesion test was carried out. The obtained results are shown in Table 1.

TABLE 1

|  | Cross Cut Adhesion Test Results |
|---|---|
| Example 1 | 100/100 |
| Example 2 | 100/100 |
| Example 3 | 100/100 |
| Example 4 | 100/100 |
| Comparative Example 1 | 0/100 |
| Comparative Example 2 | 0/100 |
| Comparative Example 3 | 0/100 |

From the foregoing results, it is seen that a coating formed from the fluorine-containing coating composition of the present invention shows an excellent adhesion to a coating formed from an epoxy resin paint even after the lapse of a considerable time from the point of the formation of the epoxy resin paint coating.

We claim:

1. A fluorine-containing copolymer composition comprising (A) a fluorine-containing copolymer comprising (a) a fluoro-olefin and (b) an organic silicon compound having an olefinic unsaturated bond and a hydrolyzable group in the molecule and (B) an organic silicon compound having an isocyanate group.

2. A fluorine-containing copolymer composition as set forth in claim 1, wherein the organic silicon compound [B] is incorporated in an amount of 0.1 to 60 parts by weight per 100 parts by weight of the fluorine-containing copolymer [A].

3. A fluorine-containing copolymer composition as set forth in claim 1, wherein the fluorine-containing copolymer [A] comprises 25 to 70 mole % of the fluoro-olefin (a).

4. A fluorine-containing copolymer composition as set forth in claim 1, wherein the fluorine-containing copolymer [A] comprises 1 to 50 mole % of the organic silicon compound (b).

5. A fluorine-containing copolymer composition as set forth in claim 1, wherein the fluoro-olefin (a) has 2 or 3 carbon atoms.

6. A fluorine-containing copolymer composition as set forth in claim 1, wherein the organic silicon compound (b) is a silane compound represent by the following general formula [I], [II] or [III]:

$$R^1R^2SiY^1Y^2 \quad \text{[I]},$$

$$R^1X^1SiY^1Y^2 \quad \text{[II] or}$$

$$R^1SiY^1Y^2Y^3 \quad \text{[III]}$$

wherein $R^1$ and $R^2$, which may be the same or different, represent a monovalent organic group having an olefinic unsaturated bond, $X^1$ represents a monovalent organic group having no olefinic unsaturated bond, and $Y^1$, $Y^2$ and $Y^3$, which are the same or different, represent a hydrolyzable group.

7. A fluorine-containing copolymer composition as set forth in claim 6, wherein $R^1$ is a vinyl group, and $Y^1$, $Y^2$ and $Y^3$ represent an alkoxy group or an alkoxyalkopxy group.

8. A fluorine-containing copolymer composition as set forth in claim 6, wherein the silane compound is a member selected from the group consisting of vinyltrimethoxysilane, vinyltriethoxysilane, vinyltris(methoxyethoxy)silane, vinyloxypropyltrimethoxysilane, vinylmethyldiethoxysilane and vinylphenyldimethoxysilane.

9. A fluorine-containing copolymer composition as set forth in claim 1, wherein the fluorine-containing copolymer [A] further comprises at least one comonomer component selected from the group consisting of (c) an alkylvinyl ether, (d) a carboxylic acid vinyl ester and (e) an unsaturated carboxylic acid or a derivative thereof.

10. A fluorine-containing copolymer composition as set forth in claim 1, wherein the organic silicon compound [B] has at least one hydrolyzable group.

11. A fluorine-containing copolymer composition as set forth in claim 10, the organic silicon compound [B] is represented by the following general formula IV:

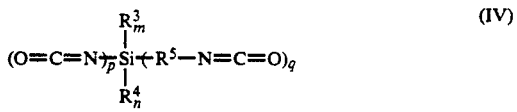

(IV)

wherein $R^3$ represents a hydrolyzable group, $R^4$ represents a hydrogen atom or an organic group, $R^5$ represents an organic group, when there are present a plurality of groups $R^3$, $R^4$ or $R^5$, they may be the same or different, m is an integer of from 0 to 3, n is an integer of from 0 to 3, p is an integer of from 0 to 4, and q is an integer of from 0 to 4, with the proviso that the requirements of $m+n+p+q=4$ and $p+q \geq 1$ are satisfied.

12. A fluorine-containing copolymer composition as set forth in claim 10, wherein the organic silicon compound B is represented by the following general formula V:

(V)

wherein $R^6$ represents a hydrolyzable group, $R^7$ represents a hydrogen atom or an organic group, $R^8$ represents an alkylene, oxyalkylene or alkenylene group having 1 to 10 carbon atoms, m is an integer of from 1 to 3 and n is an integer of from 0 to 2, with the proviso that the requirement of $m+n=3$ is satisfied, and when there are present a plurality of groups $R^6$ or $R^7$, they may be the same or different.

13. A fluorine-containing copolymer composition as set forth in claim 12, wherein $R^6$ represents an alkoxy group, an acyloxy group, a phenoxy group, an iminoxy group or an alkenyloxy group, and $R^7$ represents an alkyl group, an aryl group or an aralkyl group.

14. A fluorine-containing copolymer composition as set forth in claim 10, wherein the organic silane compound B is represented by the following general formula VI:

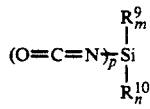

wherein R$^9$ represents a hydrolyzable group, R$^{10}$ represents an organic group, p is an integer of from 1 to 4 and m and n represent an integer of from 0 to 3, with the proviso that the requirement of p+m+n=4 is satisfied and when p is 1, m is an integer of from 1 to 3, n is an integer of from 0 to 2 and the requirement of p+m+n=4 is satisfied, and when there are present a plurality of groups R$^9$ or R$^{10}$, they may be the same or different.

15. A fluorine-containing copolymer composition as set forth in claim 14, wherein R$^9$ represents an alkoxy group, an acyloxy group or a phenoxy group, and R$^{10}$ represents an alkyl group, an alkenyl group, a cycloalkyl group, an aryl group or an arylalkyl group.

16. A fluorine-containing coating composition comprising a fluorine-containing composition as set forth in claim 1 and (C) a curing catalyst.

17. A fluorine-containing coating composition as set forth in claim 16, wherein the curing catalyst [C] is incorporated in an amount of 0.03 to 50 parts by weight per 100 parts by weight of the fluorine-containing copolymer [A].

18. A cured product obtained by curing the fluorine-containing coating composition as set forth in claim 16.

* * * * *